(12) United States Patent
Yang et al.

(10) Patent No.: US 11,287,669 B2
(45) Date of Patent: Mar. 29, 2022

(54) INTEGRATED IMAGE DISPLAY DEVICE

(71) Applicant: Lixel Inc., Taipei (TW)

(72) Inventors: Chun-Hsiang Yang, Hsinchu (TW);
Chih-Hung Ting, New Taipei (TW);
Kai-Chieh Chang, Kaohsiung (TW);
Jui-Yi Wu, Miaoli County (TW);
Hsin-You Hou, New Taipei (TW);
Ting-Ru Lin, Kaohsiung (TW)

(73) Assignee: Lixel Inc., Taipei (TW)

( * ) Notice: Subject to any disclaimer, the term of this patent is extended or adjusted under 35 U.S.C. 154(b) by 47 days.

(21) Appl. No.: 16/846,420

(22) Filed: Apr. 13, 2020

(65) Prior Publication Data
US 2021/0318552 A1 Oct. 14, 2021

(51) Int. Cl.
| | | |
|---|---|---|
| *G02B 30/32* | (2020.01) | |
| *G02B 30/29* | (2020.01) | |
| *G02F 1/13357* | (2006.01) | |
| *H04N 13/305* | (2018.01) | |
| *H04N 13/312* | (2018.01) | |
| *G02F 1/1335* | (2006.01) | |

(52) U.S. Cl.
CPC ............ *G02B 30/32* (2020.01); *G02B 30/29* (2020.01); *G02F 1/133606* (2013.01); *H04N 13/305* (2018.05); *H04N 13/312* (2018.05); *G02F 1/133562* (2021.01); *G02F 1/133607* (2021.01)

(58) Field of Classification Search
None
See application file for complete search history.

(56) References Cited

U.S. PATENT DOCUMENTS

| | | | |
|---|---|---|---|
| 2014/0055716 A1* | 2/2014 | Zhang | G02F 1/133606 349/64 |
| 2015/0192780 A1* | 7/2015 | Guo | H04N 13/31 359/462 |
| 2018/0107011 A1* | 4/2018 | Lu | G09G 3/3607 |
| 2018/0122312 A1* | 5/2018 | Niu | G09G 3/2003 |
| 2019/0222829 A1 | 7/2019 | Yang et al. | |

FOREIGN PATENT DOCUMENTS

| | | |
|---|---|---|
| CN | 103293686 A | 9/2013 |
| JP | 9311294 A | 12/1997 |
| JP | 200698971 A | 4/2006 |
| JP | 2006203668 A | 8/2006 |

(Continued)

*Primary Examiner* — Kaitlin A Retallick
(74) *Attorney, Agent, or Firm* — Li & Cai Intellectual Property Office

(57) ABSTRACT

An integrated image display device includes a display unit, a lens array layer, and a baffle assembly. The baffle assembly includes a first baffle layer and a second baffle layer. The first baffle layer includes a plurality of first baffles, and a first transmission portion is formed between each two adjacent ones of the first baffles. The second baffle layer includes a plurality of second baffles, and a second transmission portion is formed between each two adjacent ones of the second baffles. Portions of the first transmission portions overlapped with the second transmission portions form a plurality of light transmission units. An un-reconstructed image displayed by the display surface can be reconstructed by the lens array layer, and be recombined into an integrated image to form a stereo image.

12 Claims, 21 Drawing Sheets

(56) References Cited

FOREIGN PATENT DOCUMENTS

| | | | |
|---|---|---|---|
| JP | 2009276568 A | 11/2009 | |
| JP | 2010273013 A | 12/2010 | |
| JP | 2013161035 A | 8/2013 | |
| JP | 2019101115 A | 6/2019 | |
| TW | 201728963 A | 8/2017 | |
| TW | 201830061 A | 8/2018 | |
| TW | i641871 B | * 11/2018 | |
| TW | 201918065 A | 5/2019 | |
| TW | 201930962 A | 8/2019 | |

* cited by examiner

INTEGRATED IMAGE DISPLAY DEVICE

FIELD OF THE DISCLOSURE

The present disclosure relates to a display device, and more particularly to an integrated image display device. The image display device of the main technical field is a 3D stereo display technology that adapts a 3D naked-eye technology. Accordingly, the integrated image device is relatively simple and convenient for a user.

BACKGROUND OF THE DISCLOSURE

Conventional stereo image display devices mainly employ a binocular vision imaging technology. Generally, naked-eye stereo image display devices allow viewers to view images from a position directly in front of the device, and an image depth of the image display devices cannot be too far away from a display surface. However, in some applications, such as aerial terrain models, architectural models, medical 3D training, etc., when the image display devices are placed horizontally, the viewers may view the image display device from a naturally oblique viewing angle, but the conventional stereo image display technology cannot provide a natural viewing angle to the viewers at the same time. The conventional stereo image display devices provide the user with visual stimuli in only one direction, i.e., either with the image projecting out or sinking in. Therefore, the conventional stereo image display devices cannot provide a vivid sensation that the image is escaping from the confines of a plane of the display surface and floating in mid-air. Moreover, in the conventional stereo image display device, a large divergence angle of a light source of a display unit can cause the viewers to view light of other levels when moving, so that images displayed by the conventional stereo image display device possess poor quality. As a result, it is difficult for the conventional stereo image display device to achieve better stereo image display effects.

SUMMARY OF THE DISCLOSURE

In response to the above-referenced technical inadequacies, the present disclosure provides an integrated image display device to provide an effect of a floating display when displaying stereo images. As a result, viewers can view stereo images from an oblique angle and a position directly in front of the device. Accordingly, the image display devices can improve an image quality, and a divergence angle of light emitted by a display unit is able to be restricted to eliminate light of other levels, so that the image display devices have a better stereo image display effect.

In one aspect, the present disclosure provides an integrated image display device. The integrated image display device includes a display unit, a lens array layer, and a baffle assembly. The display unit includes a display surface and an image processing unit. The lens array layer is disposed adjacent to the display surface of the display unit, and the lens array layer includes a plurality of lenses. The baffle assembly includes a plurality of first baffles, and the first baffles are spaced apart from each other. The first baffles are configured to shield light so that a divergence angle of the light emitted by the display unit is able to be restricted. An un-reconstructed image displayed by the display surface is able to be reconstructed by the lens array layer, and be recombined into an integrated image to form the stereo image.

In another aspect, the present disclosure provides an integrated image display device. The integrated image display device includes a display unit, a pinhole array layer, and a baffle assembly. The display unit includes a display surface and an image processing unit. The pinhole array layer is disposed adjacent to the display surface of the display unit, and the pinhole array layer includes a main body and a plurality of pinholes. The pinholes are disposed on the main body, and the pinholes pass through two opposite sides of the main body. The baffle assembly includes a plurality of first baffles, and the first baffles are spaced from each other and configured to shield light so that a divergence angle of the light emitted by the display unit is able to be restricted. An unstructured image displayed by the display surface is able to be reorganized by the pinhole array layer, and be recombined into an integrated image to form the stereo image.

In yet another aspect, the present disclosure provides an integrated image display device. The integrated image display device includes a display unit and a baffle assembly. The display unit includes an LCD panel, a backlight module, and an image processing unit. The LCD panel further includes a display surface, and the LCD panel is able to turn on pixels that need to be used and turn off pixels that need not to be used. The backlight module includes a plurality of light sources. The baffle assembly includes a plurality of first baffles and the first baffles are spaced apart from each other and configured to shield light so that a divergence angle of the light emitted by the display unit is able to be restricted. An unstructured image displayed by the display surface is able to be reorganized by the light sources and the LCD panel, and be recombined into an integrated image to form the stereo image.

Therefore, the present disclosure can provide the floating display effect so that the viewers can view the stereo image at the forward and oblique angles. The present disclosure also provides the baffle assembly, and the baffle assembly includes the plurality of first baffles and the plurality of second baffles. The first baffles and the second baffles are configured to shield light to solve a problem that the light source has a large divergence angle of light. In addition, the first baffle layer and the second baffle layer are individual and can be manufactured separately. The first baffle layer and the second baffle layer are relatively simple and easy to manufacture, and a thickness of the image display device can be effectively reduced. In addition, according to different product applications, the image display device can limit only a single angle of the divergence angle, such as a horizontal or a vertical divergence angle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
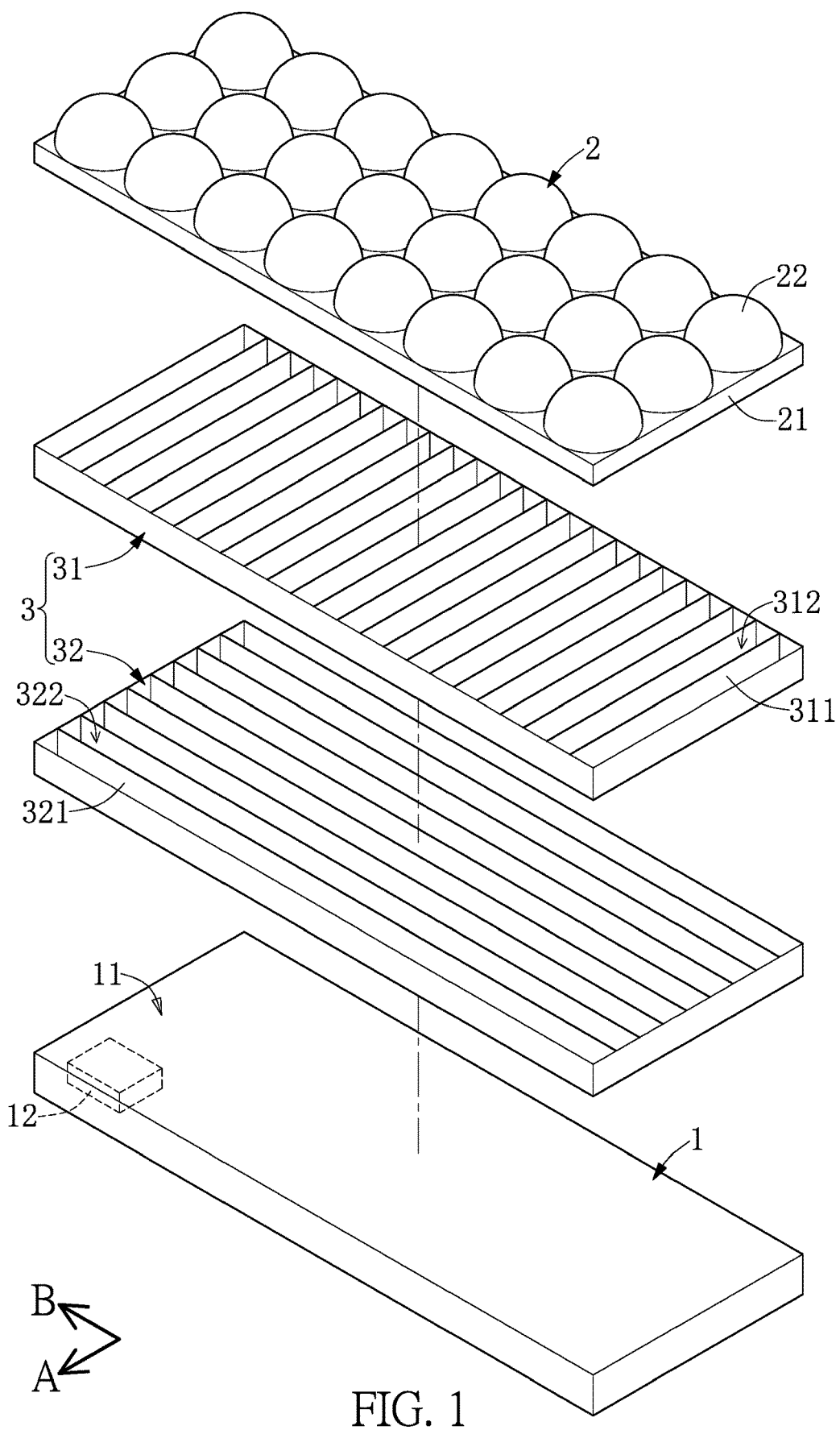
FIG. 1 is an exploded view of an integrated image display device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

The present disclosure provides an integrated stereo image display device, which can be used in many industries such as optoelectronics, medical, military, exhibition, display, education, entertainment, and consumer electronics. The integrated stereo image display device can be used in an active or passive image display device, but the present disclosure is not limited thereto.

Figure 2:
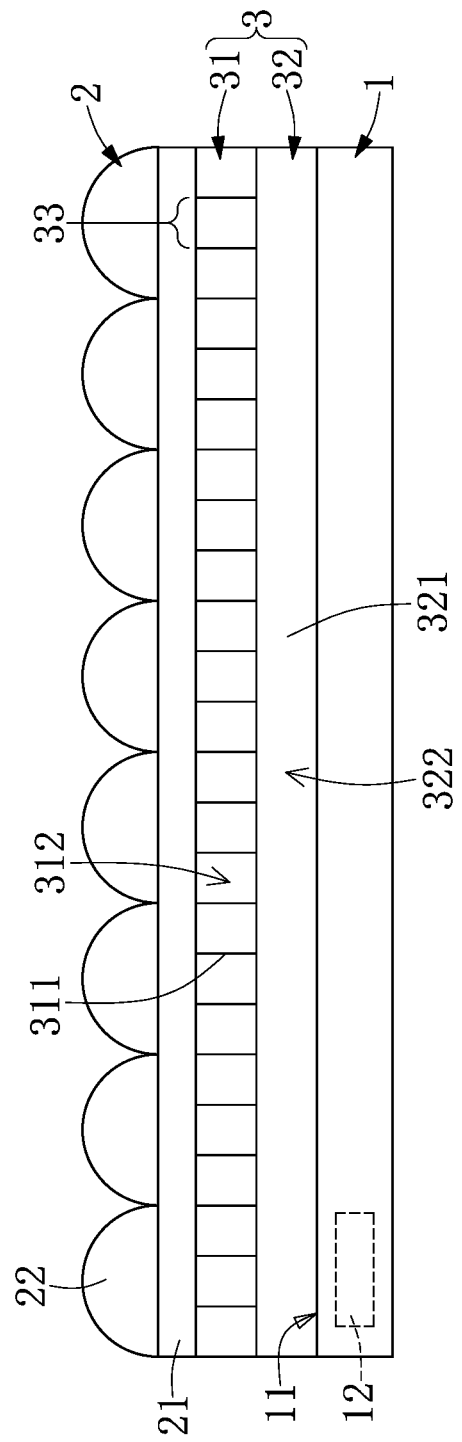
FIG. 2 is a schematic view of the integrated image display device according to the first embodiment of the present disclosure.

Referring to FIG. 1 and FIG. 2, the integrated stereo image display device includes a display unit 1, a lens array layer 2, and a gradient transmittance mask 3. The integrated stereo image display device can change stereo images that are perceived from a certain angle of view, so that the stereo images can be viewed by a viewer from different angles of view.

The display unit 1 can be a general flat display unit, and the display unit 1 includes a display surface 11 that can display images. The lens array layer 2 is disposed adjacent to the display surface 11 of the display unit 1, that is, the lens array layer 2 can be above the display unit 1. The lens array layer 2 can be arranged in contact with the display surface 11 of the display unit 1, and the lens array layer 2 and the display surface 11 of the display unit 1 may also be spaced apart from each other, or an intermediate layer can be disposed between the display surface 11 of the display unit 1 and the lens array layer 2.

The display unit 1 can be disposed as a bottom layer, and is configured to display a planar image that has not been reproduced by light. The planar image can be redistributed and combined by the lens array layer 2 to display a reconstructed 3D stereo image. The display unit 1 of the first layer only needs to display a target image, and accordingly, the display unit 1 can be any hardware structure, including a mobile phone, a tablet, or a flat screen. The type and the configuration of the display unit 1 are not limited thereto, and the display unit 1 can also be a self-illuminated display unit.

The lens array layer 2 can be disposed as an uppermost layer, and the lens array layer 2 is capable of adjusting the light field. The lens array layer 2 can modulate a light angle of stereo image so that the planar images that have not been reorganized can be redistributed and combined, and the viewers can view the 3D stereo image.

The lens array layer 2 is made of a material with good optical characteristics, and the material of the lens array layer 2 is not limited thereto. The lens array layer 2 can include a base 21 and a plurality of lenses 22. The lenses 22 are disposed on a side of the base 21, that is, the lenses 22 are disposed on a side of the base 21 away from the display unit 1. The arrangement and the configuration of the lens array layer 2 are not limited thereto, and the lenses 22 have a focusing function. An un-reconstructed image displayed by the display surface 11 is able to be reconstructed by the lens array layer 2, and be recombined into an integrated image to form a stereo image.

The integrated image display device of the present disclosure allows for 3D stereo images to be viewed from an oblique angle. That is, the viewer does not need to face the display unit 1 from a position directly in front to be able to view the 3D stereo image. In traditional naked-eye 3D stereo image display devices, most do not allow for images to be viewed from an oblique angle. Accordingly, the viewer cannot view the 3D stereo images from an oblique angle. In the present disclosure, it is a major feature that 3D stereo images can be viewed from an oblique angle. When the viewers are in the direction facing the display unit 1 (the zero-order viewing zones), the left and right sides of the viewers respectively have restricted viewing angles. Once the viewers are beyond the restricted viewing angles, the viewers cannot view the stereo information that corresponds to the corresponding angle. In order to allow for 3D stereo images to be viewed from an oblique angle, the present disclosure adopts an oblique angle display mode to focus the light path in the oblique direction instead of adopting the 0th order (forward) display mode. Accordingly, the viewer can view the stereo image from an oblique angle. The integrated stereo image display device of the present disclosure can also be applied so that the viewer can view the stereo image from a position directly in front of the device.

The display unit 1 can be of any specifications, as long as an algorithm is available. The display unit 1 includes an image processing unit 12, and the images displayed by the display unit 1 need to be calculated by the image processing unit 12. The image processing unit 12 can predict various paths that light will travel along, and then calculates the relative position of the image by the lens array architecture. Since the image processing unit 12 is well known in the art, details thereof will not be reiterated herein.

The baffle assembly 3 includes a first baffle layer 31, and the baffle assembly 3 may also include a second baffle layer 32 disposed on a side of the first baffle layer 31. The first baffle layer 31 and the second baffle layer 32 can be disposed adjacent to each other, or can be disposed spaced apart from each other. The first baffle layer 31 and the second baffle layer 32 can be respectively disposed on both sides (i.e., upper side and lower side) of the lens array layer 2, or be all disposed on a side (i.e., upper side or lower side) of the lens array layer 2. In the present embodiment, the first baffle layer 31 and the second baffle layer 32 are all disposed on a side of the lens array layer 2 that is close to the display unit 1. That is, the first baffle layer 31 and the second baffle layer 32 are all disposed below the lens array layer 2.

The first baffle layer 31 is a plate-shaped body, and the first baffle layer 31 includes a plurality of first baffles 311. The first baffles 311 are spaced apart from each other, and can be parallel or non-parallel to each other. The first baffles 311 extend along a first direction A. The first baffles 311 can be perpendicular to the display surface 11 of the display unit 1, or the first baffles 311 can also be not perpendicular to the display surface 11 of the display unit 1. For example, the first baffles 311 can be inclined to the display surface 11 of the display unit 1. A first transmission portion 312 is formed between each two adjacent ones of the first baffles 311, and the first transmission portion 312 is elongated. The first transmission portions 312 can be hollow bodies, and a light-transmitting material may also be disposed inside each of the first transmission portions 312 to form a solid shape. The first baffles 311 are configured to shield light so that a divergence angle of the light emitted by the display unit 1 is able to be restricted. An unstructured image displayed by the display surface 11 is able to be reorganized by the lens array layer 2 and be recombined into the integrated images to form stereo images.

The second baffle layer 32 is a plate-shaped body, and the second baffle layer 32 includes a plurality of second baffles 321. The second baffles 321 are spaced apart from each other, and can be parallel or non-parallel to each other. The second baffles 321 extend along a second direction B. The first direction A and the second direction B can be perpendicular to each other so that the first baffles 311 and the second baffles 321 can be perpendicular to each other, but the present disclosure is not limited thereto. The first baffles 311 and the second baffles 321 can also be not perpendicular to each other. The second baffles 321 can be perpendicular to the display surface 11 of the display unit 1, or the second baffles 321 can also not be perpendicular to the display surface 11 of the display unit 1. For example, the second baffles 321 can be inclined to the display surface 11 of the display unit 1. A second transmission portion 322 is formed between each two adjacent ones of the second baffles 321, and the second transmission portions 322 are elongated. The second transmission portions 322 can be hollow bodies, and a light-transmitting material may also be disposed inside each of the second transmission portions 322 to form the solid shape.

Figure 20:
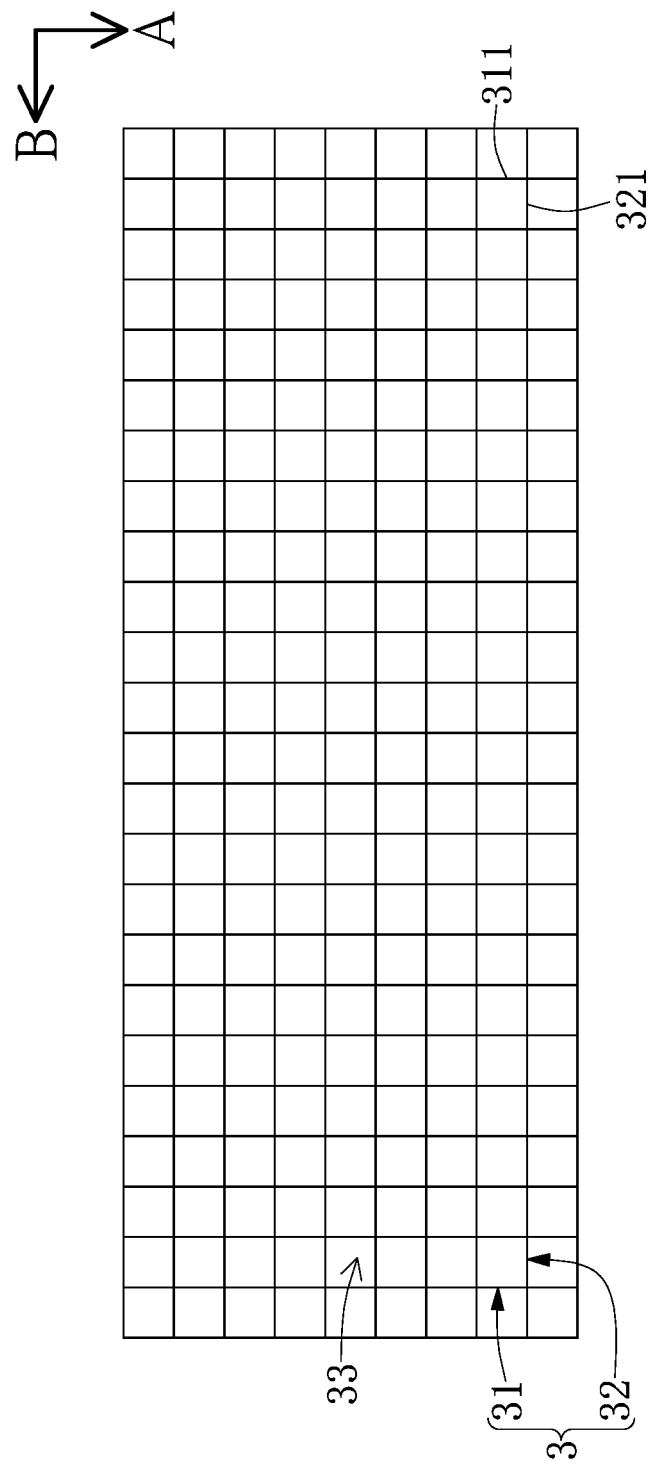
FIG. 20 is a schematic top view of a baffle assembly according to the present disclosure.

Portions of the first transmission portions 312 overlapped with the second transmission portions 322 form a plurality of light transmission units 323 (as shown in FIG. 20), and the light transmission units 323 are arranged in an array manner. The light transmission units 323 pass through two opposite sides of the baffle assembly 3. In the present embodiment, the plurality of light transmission units 323 correspond to a lens 22, and the light transmission units 323 are densely disposed to achieve the effect of thinning the baffle assembly 3. The light transmission units 323 are capable of allowing light to pass through. The first baffles 311 and the second baffles 321 are configured to shield light so that the divergence angle of the light emitted by the display unit 1 is able to be restricted, and the light cannot be emitted to the lens array layer 2. Accordingly, the image display devices eliminate light of other level, so that the image display devices have the better stereo image display effect.

Figure 3:
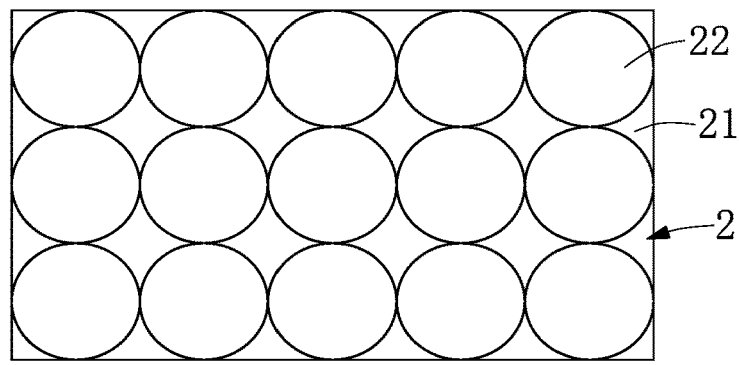
FIG. 3 is a schematic view of a relative arrangement of lens arrays according to the first embodiment of the present disclosure.
Figure 4:
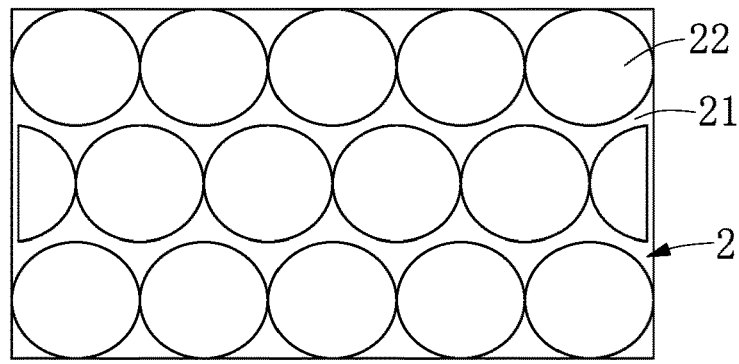
FIG. 4 is a schematic view of a staggered arrangement of lens arrays according to the first embodiment of the present disclosure.

The baffle assembly 3 can be disposed between the display unit 1 and the lens array layer 2, and the baffle assembly 3 may also be disposed (or formed) on the display unit 1 or the lens array layer 2. The baffle assembly 3 can improve the image quality, so that the light emitted by the display unit 1 is able to be restricted, and the light cannot be emitted to the lens array layer 2. Accordingly, the image display devices eliminate light of other levels, so that the image display devices have the better stereo image display effect. The baffle assembly 3 can restrict light from being radiated within predetermined angles in the left and right directions (angle control) and the front and rear directions (oblique angle) to eliminate light of other levels so that the image display devices have the better stereo image display effect. The lens array layer 2 of the present disclosure has a very significant correlation with the display effect of the image display device. As shown in FIG. 3, the lens array can be arranged in a rectangle manner, so that the lenses 22 in two adjacent columns can be arranged in an aligned arrangement. As shown in FIG. 4, the lens array may also be arranged in a hexagonal arrangement, so that the lenses 22 in each two adjacent columns can be arranged in a staggered arrangement. The lens array can also be in other arrangements, that can display 3D image information.

Figure 5:
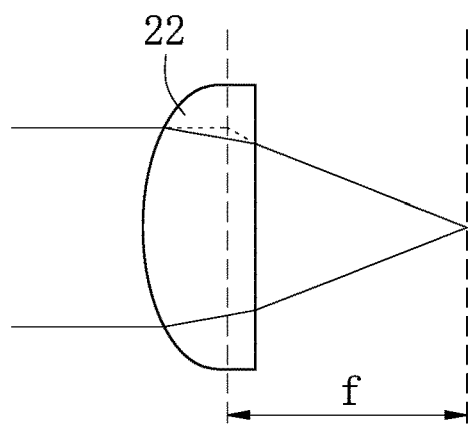
FIG. 5 is a schematic view of an application that a single lens focusing according to the first embodiment of the present disclosure.

The micro-structures of the lens array layer 2 are the lenses with a focusing function. The specification of each of the lenses 22 will determine the lens focusing ability according to the refractive index n value of the material. Each of the lenses 22 transmits light having a wavelength ranging from 300 nm to 1100 nm. As shown in FIG. 5, each of the lenses 22 conforms to the Lensmaker's equation: $1/f=(n-1)(1/R1+1/R2)$, in which R1 and R2 are respective curvature radiuses of two opposite surfaces of the lens, f is a focal length of the lens, and n is a refractive index of the lens. In addition, each of the lenses 22 has a diameter of 10 um to 3 cm (preferably 10 um to 5 mm) so as to be suitable for image display devices with different sizes.

The present disclosure provides an integrated image display device that can be applied to hardware settings so that the viewer can view the stereo image from an oblique angle and a position directly in front of the device. The image display device can control the direction of light travel of pixels at various positions in the image display device through optical elements. The hardware system of the present disclosure consists of simple optical elements, including a display unit 1, a lens array layer 2, and a baffle assembly 3. The simple optical elements can be packaged into a kit, and can present a real image in stereo space by a designed pixel size, system gap, lens size and focal length with the integrated image principle and a special algorithm through the screen output signal.

Second Embodiment

Figure 6:
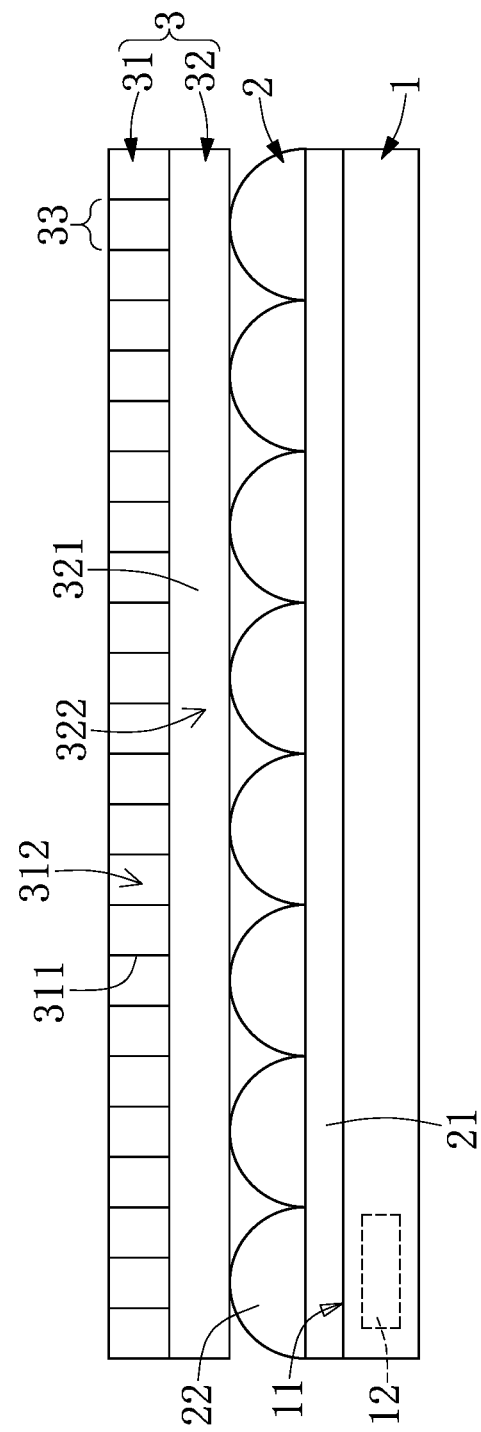
FIG. 6 is a schematic view of the integrated image display device according to a second embodiment of the present disclosure.

Referring to FIG. 6, the configuration of the image display device of the present embodiment is substantially the same as that of the first embodiment of the present disclosure described above. The only difference is that the first baffle layer 31 and the second baffle layer 32 are all disposed on a side of the lens array layer 2 that is away from the display unit 1. That is, the first baffle layer 31 and the second baffle layer 32 are all disposed above the lens array layer 2. The first baffles 311 and the second baffles 321 are configured to shield light to eliminate light of other levels, so that the image display devices have the better stereo image display effect.

Third Embodiment

Figure 7:
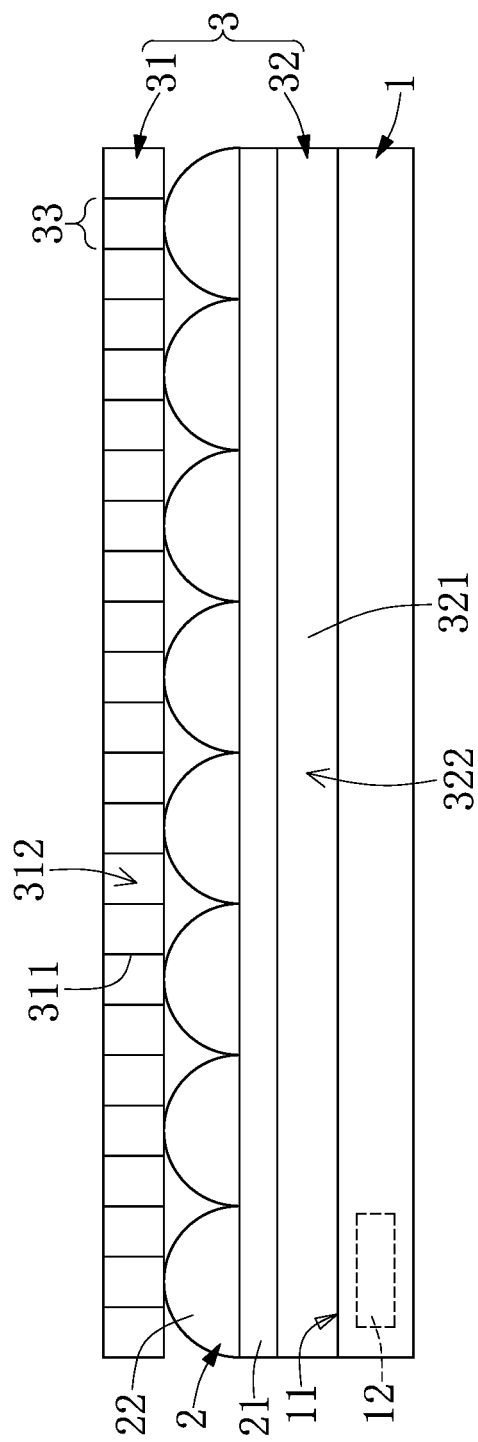
FIG. 7 is a schematic view of the integrated image display device according to a third embodiment of the present disclosure.

Referring to FIG. 7, the configuration of the image display device of the present embodiment is substantially the same as that of the first embodiment of the present disclosure described above. The only difference is that the first baffle layer 31 and the second baffle layer 32 are respectively disposed on two sides of the lens array layer 2. That is, the first baffle layer 31 is disposed above the lens array layer 2, and the second baffle layer 32 is disposed below the lens array layer 2. The first baffles 311 and the second baffles 321 are configured to shield light to eliminate light of other levels, so that the image display devices have the better stereo image display effect.

Fourth Embodiment

Figure 8:
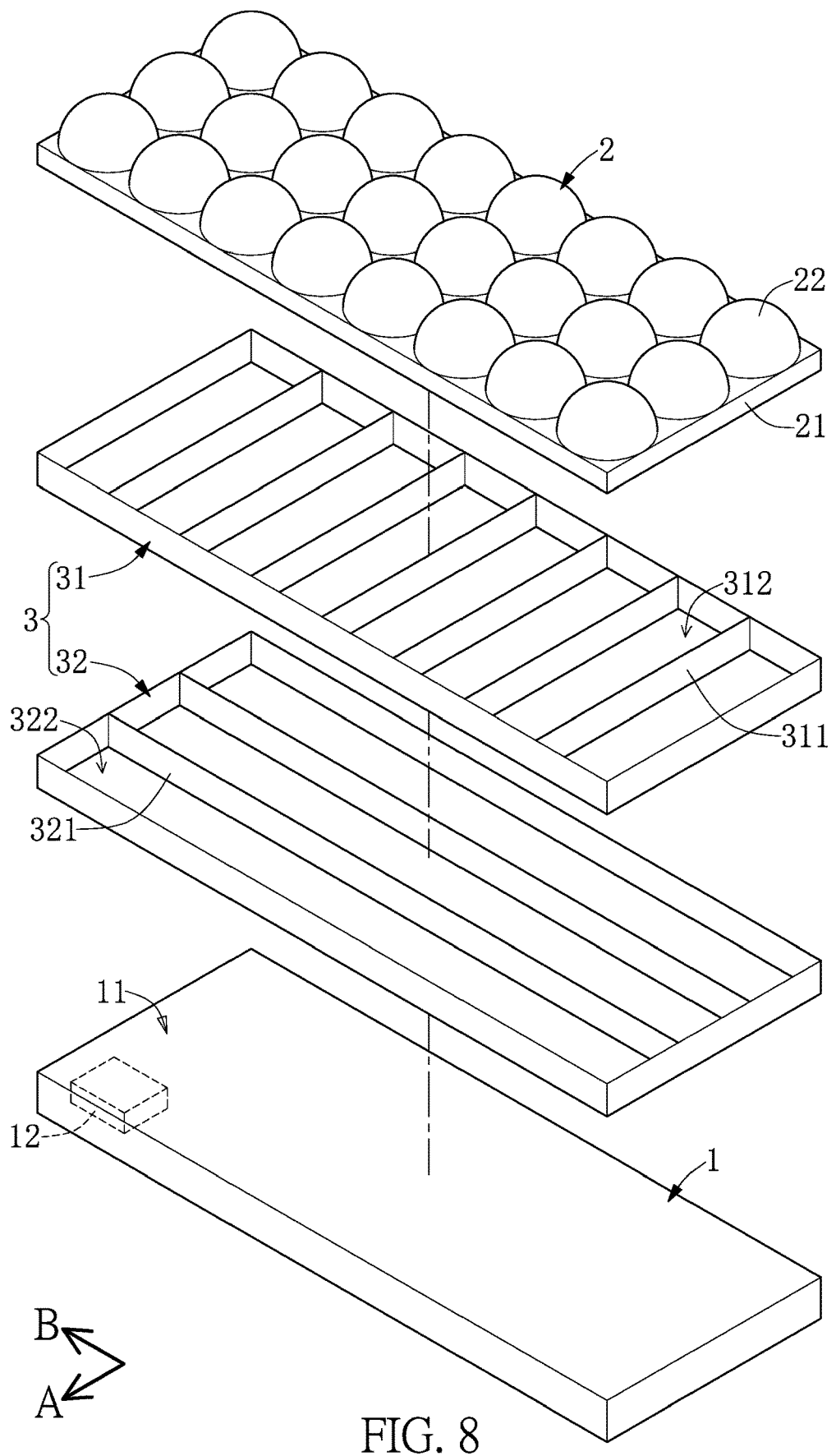
FIG. 8 is an exploded view of the integrated image display device according to a fourth embodiment of the present disclosure.

Referring to FIG. 8, the configuration of the image display device of the present embodiment is substantially the same as that of the first embodiment of the present disclosure described above. The only difference is that one of the transmission units 33 (not labeled) corresponds to one of the lenses 22, so that the light transmission units 323 respectively correspond to the lenses 22. The first baffles 311 and the second baffles 321 are configured to shield light to eliminate light of other levels, so that the image display devices have the better stereo image display effect.

Fifth Embodiment

Figure 9:
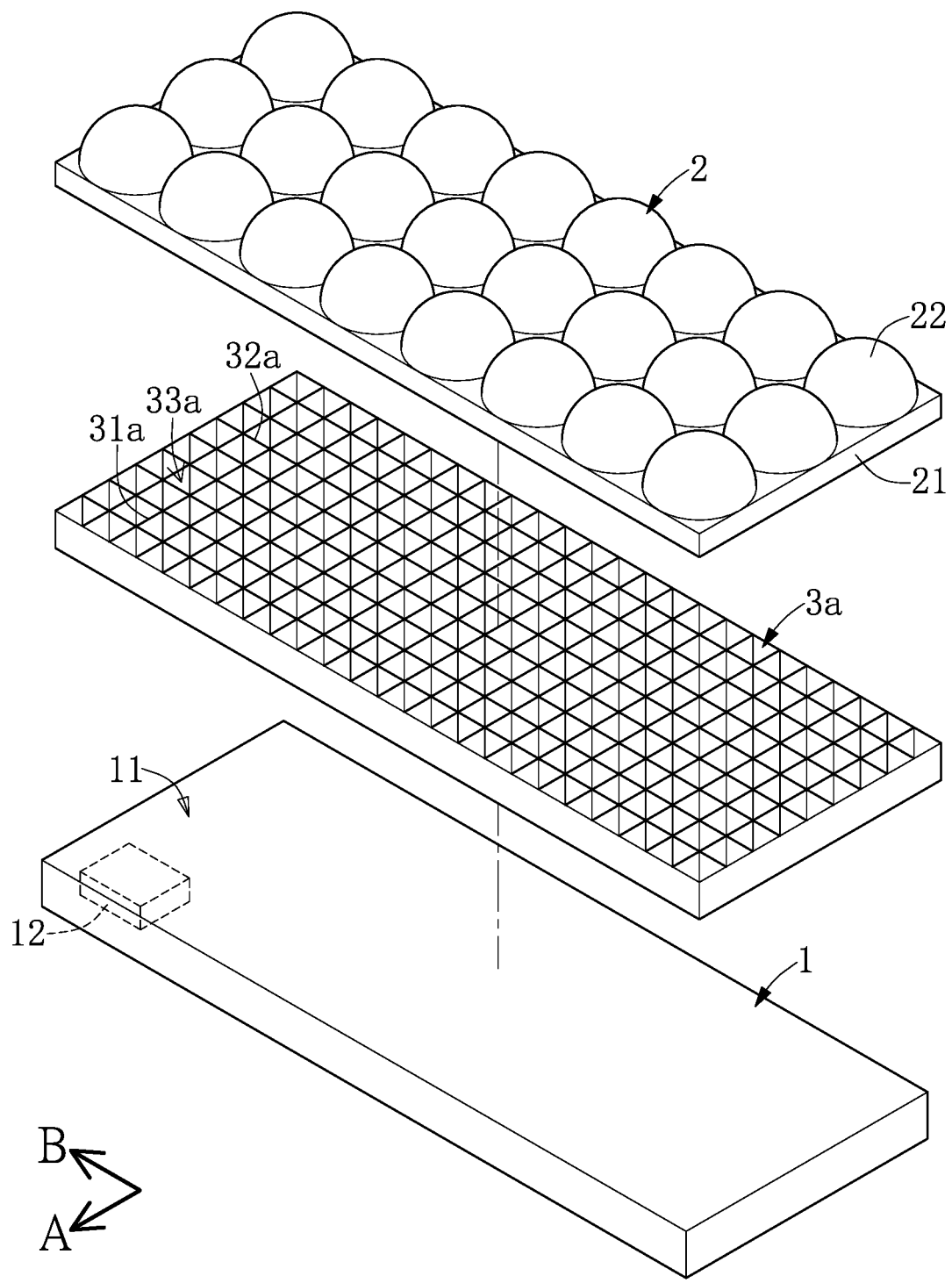
FIG. 9 is an exploded view of the integrated image display device according to a fifth embodiment of the present disclosure.

Referring to FIG. 9, the configuration of the image display device of the present embodiment is substantially the same as that of the first embodiment of the present disclosure described above. The only difference is that the configuration of the baffle assembly 3a is changed, and the baffle assembly 3a is designed as a single layer. The baffle assembly 3a can be disposed on a side of the lens array layer 2 that is close to or away from the display unit 1, that is, the baffle assembly 3a can be disposed above or below the lens array layer 2. The baffle assembly 3a is a plate-shaped body and includes the plurality of first baffles 31a. The baffle assembly 3a can further include the plurality of second baffles 32a. The first baffles 31a are spaced apart from each other and can be parallel or non-parallel to each other. The first baffles 31a extend along the first direction A. The first baffles 31a can be perpendicular to the display surface 11 of the display unit 1, or the first baffles 31a may also be inclined to the display surface 11 of the display unit 1. The first baffles 31a are configured to shield light so that the divergence angle of the light emitted by the display unit 1 is able to be restricted. The un-reconstructed image displayed by the display surface 11 is able to be reconstructed by the lens array layer 2, and be recombined into the integrated image to form the stereo images.

The second baffles 32a are spaced apart from each other, and can be parallel or non-parallel to each other. The second baffles 32a extend along the second direction B, and the second baffles 32a can be perpendicular to the display surface 11 of the display unit 1. The second baffles 32a may also be inclined to the display surface 11 of the display unit 1. The first baffles 31a and the second baffles 32a can be staggered with each other, or not. The plurality of light transmission units 323 are respectively formed between the first baffles 31a and the second baffles 32a, and the light transmission units 323 are arranged in the array manner. The light transmission units 323 pass through two opposite sides of the baffle assembly 3a, and the light transmission units 323 are capable of allowing light to pass through. The first baffles 31a and the second baffles 32a are configured to shield light so that the divergence angle of the light emitted by the display unit 1 is able to be restricted. Accordingly, the image display devices eliminate light of other levels, so that the image display devices have the better stereo image display effect.

Sixth Embodiment

Figure 10:
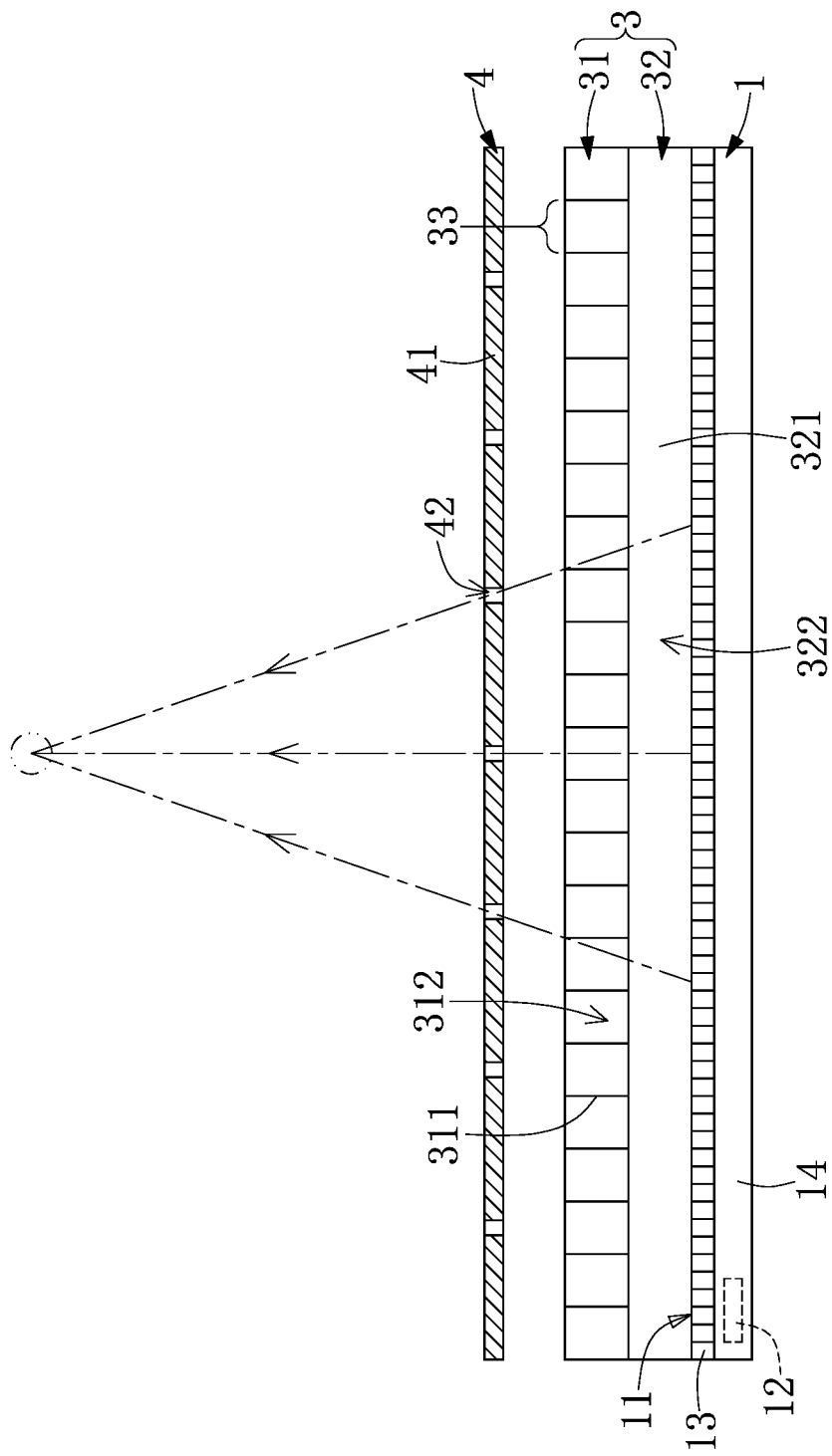
FIG. 10 is a schematic view of the integrated image display device according to a sixth embodiment of the present disclosure.

Referring to FIG. 10, in the present embodiment, a pinhole array layer 4 is mainly used to replace the lens array layer 2 in the first embodiment of the present disclosure. The integrated image display device includes a display unit 1, a pinhole array layer 4, and a baffle assembly 3. The display unit 1 can include an LCD panel 13 and a backlight module 14. A display surface 11 is located on the LCD panel 13. The backlight module 14 is close to the LCD panel 13. The backlight module 14 can project a light source and transmit light to the eyes of the viewers after passing light through the LCD panels 13. In the present embodiment, the display unit 1 is a passive light-emitting display device. In another embodiment of the present disclosure, the display unit 1 may also be an active light-emitting display unit, such as an OLED or an LED display unit. Since the configuration of the baffle assembly is the same as that of the first embodiment of the present disclosure, such details will not be reiterated herein.

The pinhole array layer 4 can be disposed adjacent to the display surface 11 of the display unit 1, that is, the pinhole array layer 4 can be disposed above the display unit 1. The pinhole array layer 4 can be arranged in contact with the display surface 11 of the display unit 1, and the pinhole array layer 4 may also be spaced apart from the display surface 11 of the display unit 1, or an intermediate layer can be disposed between the display surface 11 of the display unit 1 and the pinhole array layer 4. The pinhole array layer 4 may also be disposed inside of the display unit 1 or other appropriate locations.

The display unit 1 can be disposed as the bottom layer, and is configured to display the planar images that have not been reproduced by light. The planar image can be redistributed and combined by the pinhole array layer 4 to display the reconstructed 3D stereo image. The pinhole array layer 4 can be disposed on the uppermost layer, and the pinhole array layer 4 is capable of adjusting a light field. The pinhole array layer 4 can modulate the light angle of a stereo image so that the planar images that have not been reorganized can be redistributed and combined, and the viewers can view the 3D stereo image.

The material of the pinhole array layer 4 is not limited in the present disclosure. The pinhole array layer 4 includes a main body 41 and a plurality of pinholes 42, and the main body 41 is made of an opaque material so that the main body 41 is an opaque member. The main body 41 is a plate-shaped body, and the pinholes 42 are preferably circular holes. The pinholes 42 are disposed on the main body 41, and the pinholes 42 can pass through two opposite sides of the main body 41. The distance between each two adjacent pinholes 42 is less than 5 mm, and the diameter of each pinhole 42 is less than 1 mm. The pinholes 42 have a focusing function, and the un-reconstructed images displayed by the display surface 11 can be reorganized by the pinholes 42 with the pinhole principle to be recombined into the integrated image to form a stereo image. The pinholes 42 can be hollow, and a light-transmissible material can be disposed inside of the pinhole 42 so that light can pass through the pinhole 42. The pinhole array layer 4 of the present disclosure has a very significant correlation with the display effect of the image display device. The pinhole array can be arranged in a rectangle or hexagon arrangement, that is, the pinholes 42 in two adjacent rows can be arranged in an aligned arrangement or a staggered arrangement, and the lens array can also be arranged in other ways. Accordingly, the pinhole array layer 4 and the lens array layer 2 can be used to display 3D image information.

The baffle assembly 3 includes a first baffle layer 31 and a second baffle layer 32, and the baffle assembly 3 has a plurality of light transmission units 323. In the present embodiment, the plurality of light transmission units 323 corresponds to a pinhole 42 and can provide light to pass through. The first baffles 311 and the second baffles 321 are configured to shield light so that the divergence angle of the light emitted by the display unit 1 is able to be restricted, and the light cannot be emitted to the pinhole array layer 4. Accordingly, the image display devices eliminate light of other levels, so that the image display devices have the better stereo image display effect.

Seventh Embodiment

Figure 11:
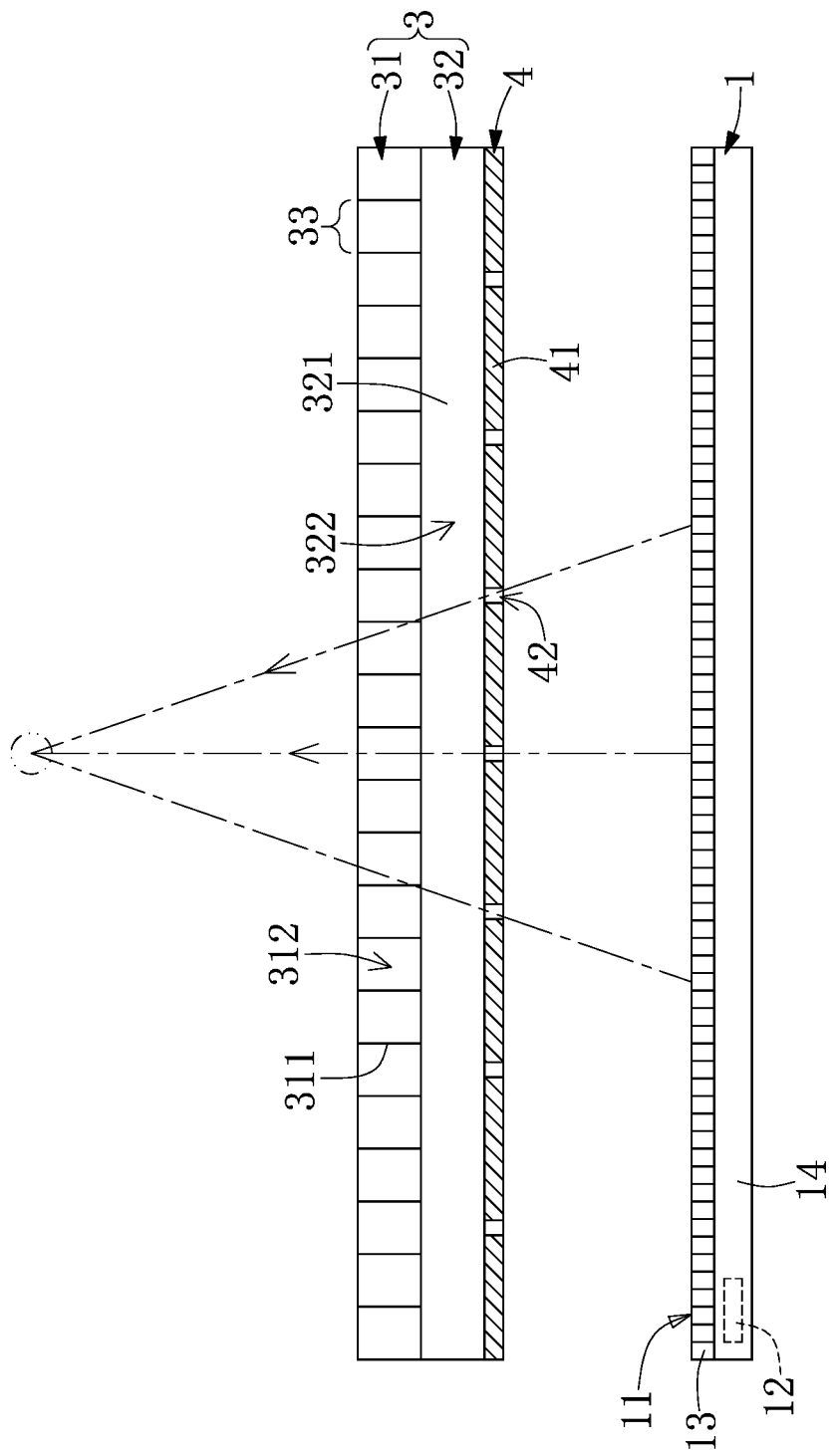
FIG. 11 is a schematic view of the integrated image display device according to a seventh embodiment of the present disclosure.

Referring to FIG. 11, the configuration of the image display device of the present embodiment is substantially the same as that of the sixth embodiment of the present disclosure described above. The only difference is that the first baffle layer 31 and the second baffle layer 32 are all disposed on a side of the pinhole array layer 4 that is away from the display unit 1, that is, the first baffle layer 31 and the second baffle layer 32 are all disposed above the pinhole array layer 4. The first baffles 311 and the second baffles 321 are configured to shield light to eliminate light of other levels, so that the image display devices have the better stereo image display effect.

Eighth Embodiment

Figure 12:
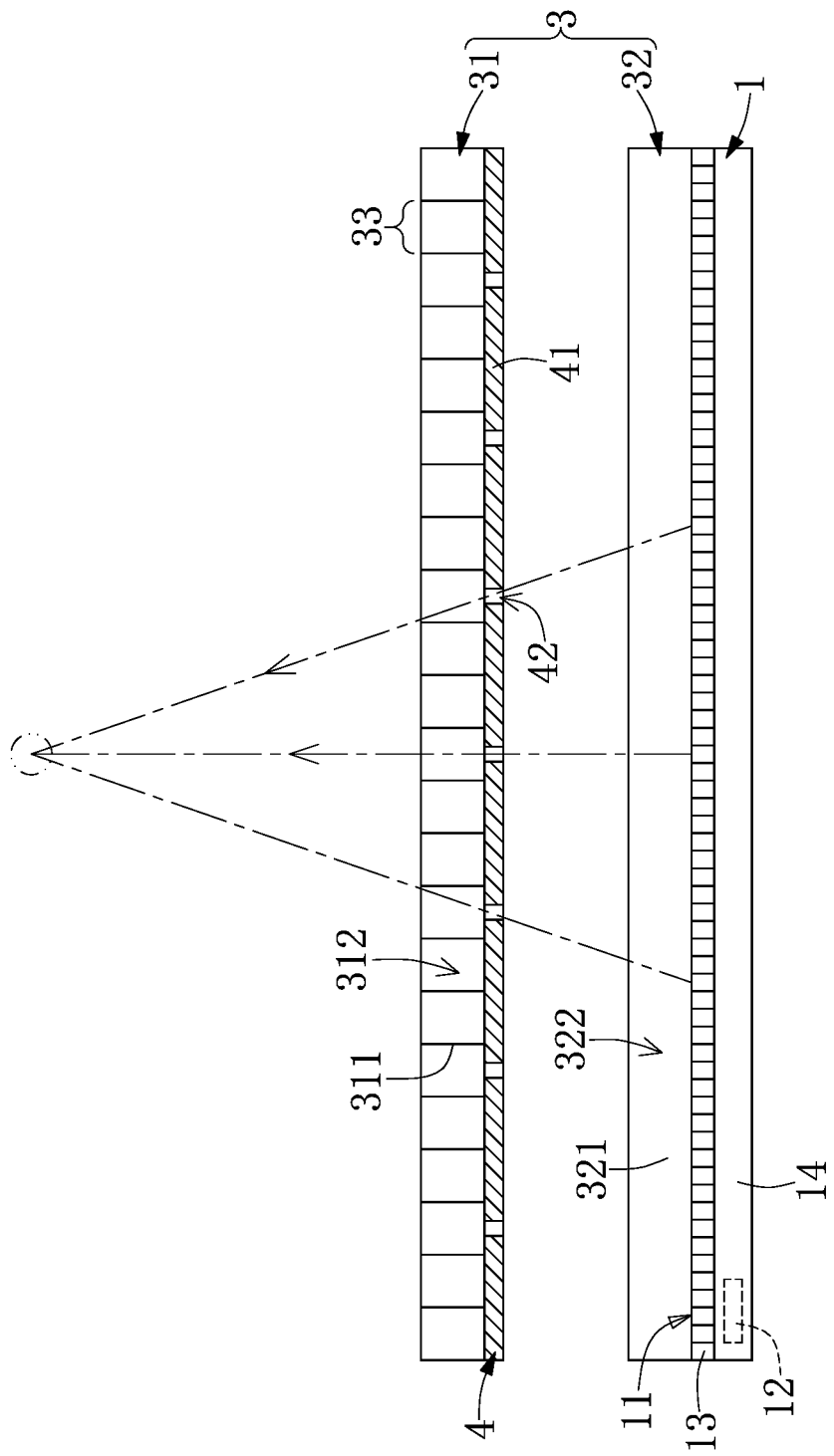
FIG. 12 is a schematic view of the integrated image display device according to an eighth embodiment of the present disclosure.

Referring to FIG. 12, the configuration of the image display device of the present embodiment is substantially the same as that of the sixth embodiment of the present disclosure described above. The only difference is that the first baffle layer 31 and the second baffle layer 32 are respectively disposed on two sides of the pinhole array layer 4, that is, the first baffle layer 31 is disposed above the pinhole array layer 4, and the second baffle layer 32 is disposed below the pinhole array layer 4. The first baffles 311 and the second baffles 321 are configured to shield light to eliminate light of other levels, so that the image display devices have the better stereo image display effect.

Ninth Embodiment

Figure 13:
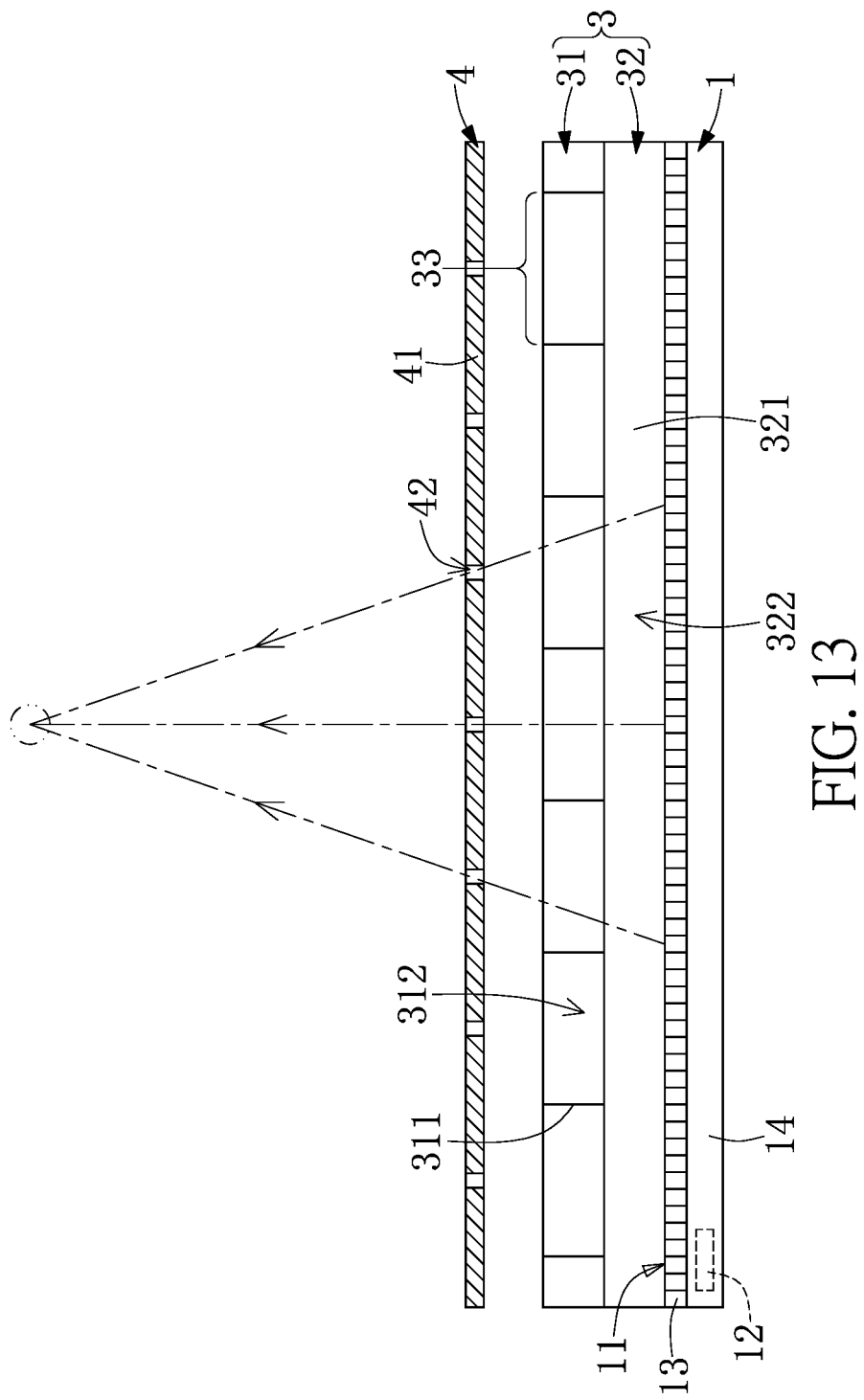
FIG. 13 is a schematic view of the integrated image display device according to a ninth embodiment of the present disclosure.

Referring to FIG. 13, the configuration of the image display device of the present embodiment is substantially the same as that of the sixth embodiment of the present disclosure described above. The only difference is that one of the transmission units 33 corresponds to one of the pinholes 42 so that the transmission units 33 respectively correspond to the pinholes 42. The first baffles 311 and the second baffles 321 are configured to shield light to eliminate light of other levels, so that the image display devices have the better stereo image display effect.

Tenth Embodiment

Figure 14:
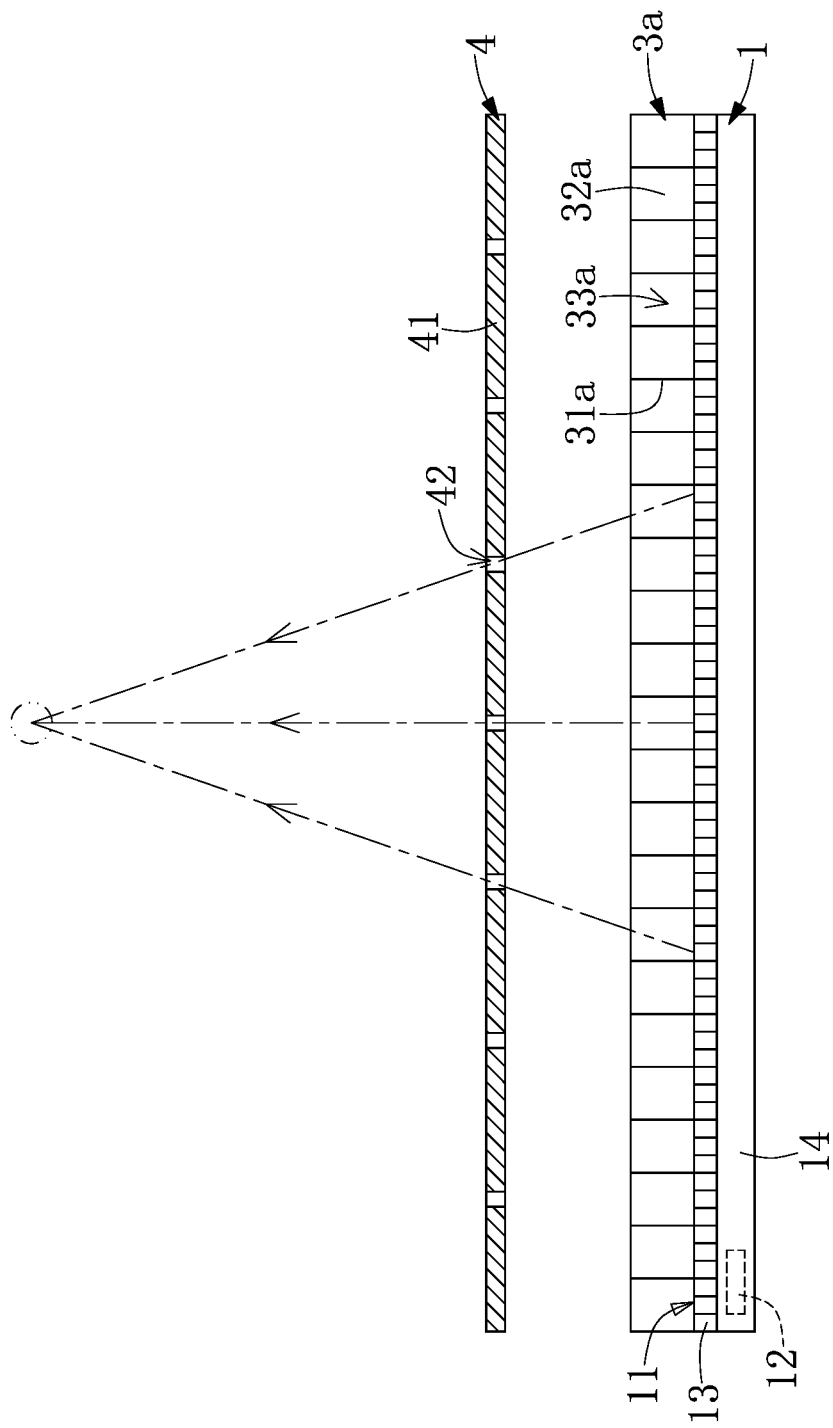
FIG. 14 is a schematic view of the integrated image display device according to a tenth embodiment of the present disclosure.

Referring to FIG. 14, the configuration of the image display device of the present embodiment is substantially the same as that of the sixth embodiment of the present disclosure described above. The only difference is that the baffle assembly 3a is designed as a single layer, and the baffle assembly 3a can be disposed on a side of the pinhole array layer 4 close to or away from the display unit 1. The baffle assembly 3a includes the plurality of first baffles 31a and the plurality of second baffles 32a. The configuration of the baffle assembly 3a is the same as that of the fifth embodiment of the present disclosure, and it will not be reiterated herein. The first baffles 31a and the second baffles 32a are configured to shield light so that the divergence angle of the light emitted by the display unit 1 is able to be restricted, and the light cannot be emitted to the pinhole array layer 4. Accordingly, the image display devices eliminate light of other levels, so that the image display devices have the better stereo image display effect.

Eleventh Embodiment

Figure 15:
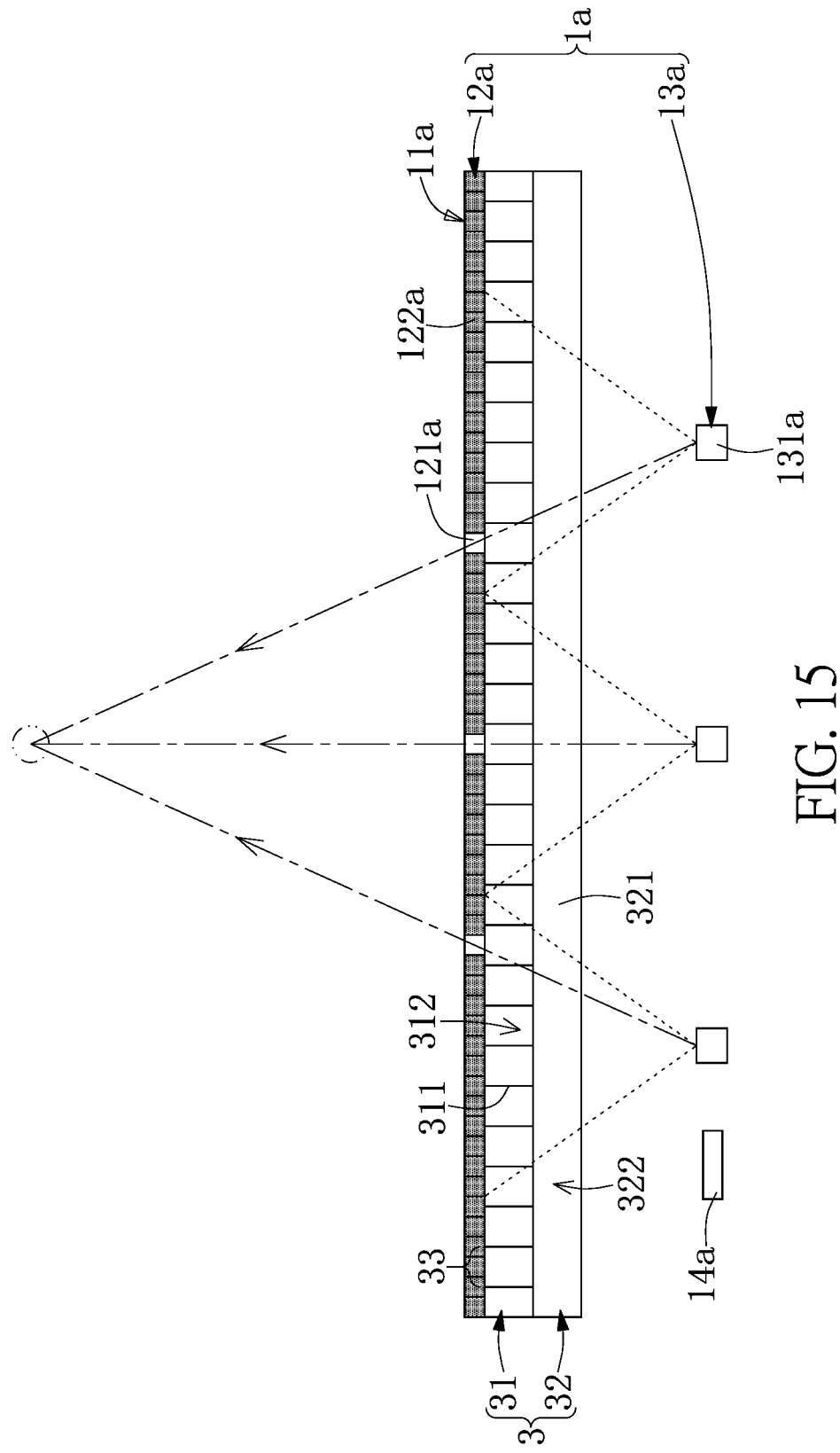
FIG. 15 is a schematic view of the integrated image display device according to an eleventh embodiment of the present disclosure.

Referring to FIG. 15, in the present embodiment, the integrated image display device includes a display unit 1a and a baffle assembly 3. The display unit 1a includes an LCD panel 12a, a backlight module 13a, and an image processing unit 14a. The LCD panel 12a includes a display surface 11a, and the backlight module 13a can project a light source and transmit light to the eyes of the viewers after passing light through the LCD panels 12a. In the present embodiment, the LCD panel 12a can turn on the pixels 121a that need to be used and turn off the pixels 122a that are not needed to be used by the software. The backlight module 13a includes a plurality of light sources 131a, and the light sources 131a can be LEDs or OLEDs. The light sources 131a are disposed spaced apart from each other, and the light sources 131a can provide functions as a pinhole array layer 4. The light sources 131a can project light and transmit light to the eyes of the viewers after passing light through the LCD panels 12a. The planar images of the display unit 1a can display the reconstructed 3D stereo image by the light sources 131a and the LCD panel.

The configuration of the baffle assembly 3 is the same as that of the first embodiment of the present disclosure, and includes a first baffle layer 31 and a second baffle layer 32. The first baffle layer 31 and the second baffle layer 32 can be disposed on two sides (i.e., upper side and lower side) of the LCD panel 12a, or can be all disposed on a side (i.e., upper side or lower side) of the LCD panel 12a. In the present embodiment, the first baffle layer 31 and the second baffle layer 32 are all disposed on a side of the LCD panel 12a that is close to the backlight module 13a. The plurality of light transmission units 323 corresponds to a pixel 121a that needs to be used. The light transmission units 323 are capable of allowing light to pass through. The first baffles 311 and the second baffles 321 are configured to shield light so that the divergence angle of the light emitted by the display unit 1a is able to be restricted. Accordingly, the image display devices eliminate light of other levels, so that the image display devices have the better stereo image display effect.

Twelfth Embodiment

Figure 16:
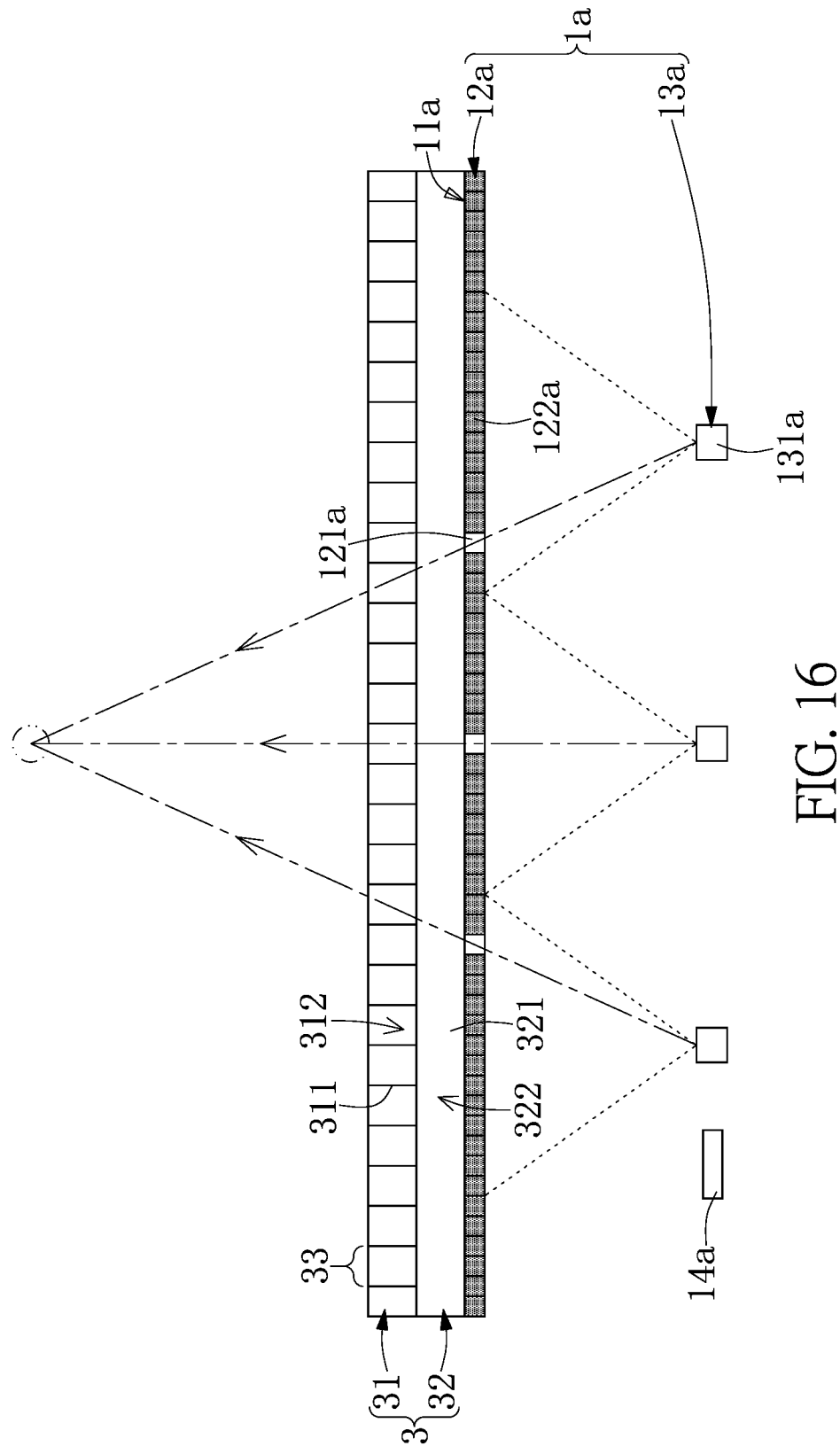
FIG. 16 is a schematic view of the integrated image display device according to a twelfth embodiment of the present disclosure.

Referring to FIG. 16, the configuration of the image display device of the present embodiment is substantially the same as that of the eleventh embodiment of the present disclosure described above. The only difference is that the first baffle layer 31 and the second baffle layer 32 are all disposed on a side of the LCD panel 12a that is away from the backlight module 13a, that is, the first baffle layer 31 and the second baffle layer 32 are all disposed above the LCD panel 12a. The first baffles 311 and the second baffles 321 are configured to shield light to eliminate light of other levels, so that the image display devices have the better stereo image display effect.

Thirteenth Embodiment

Figure 17:
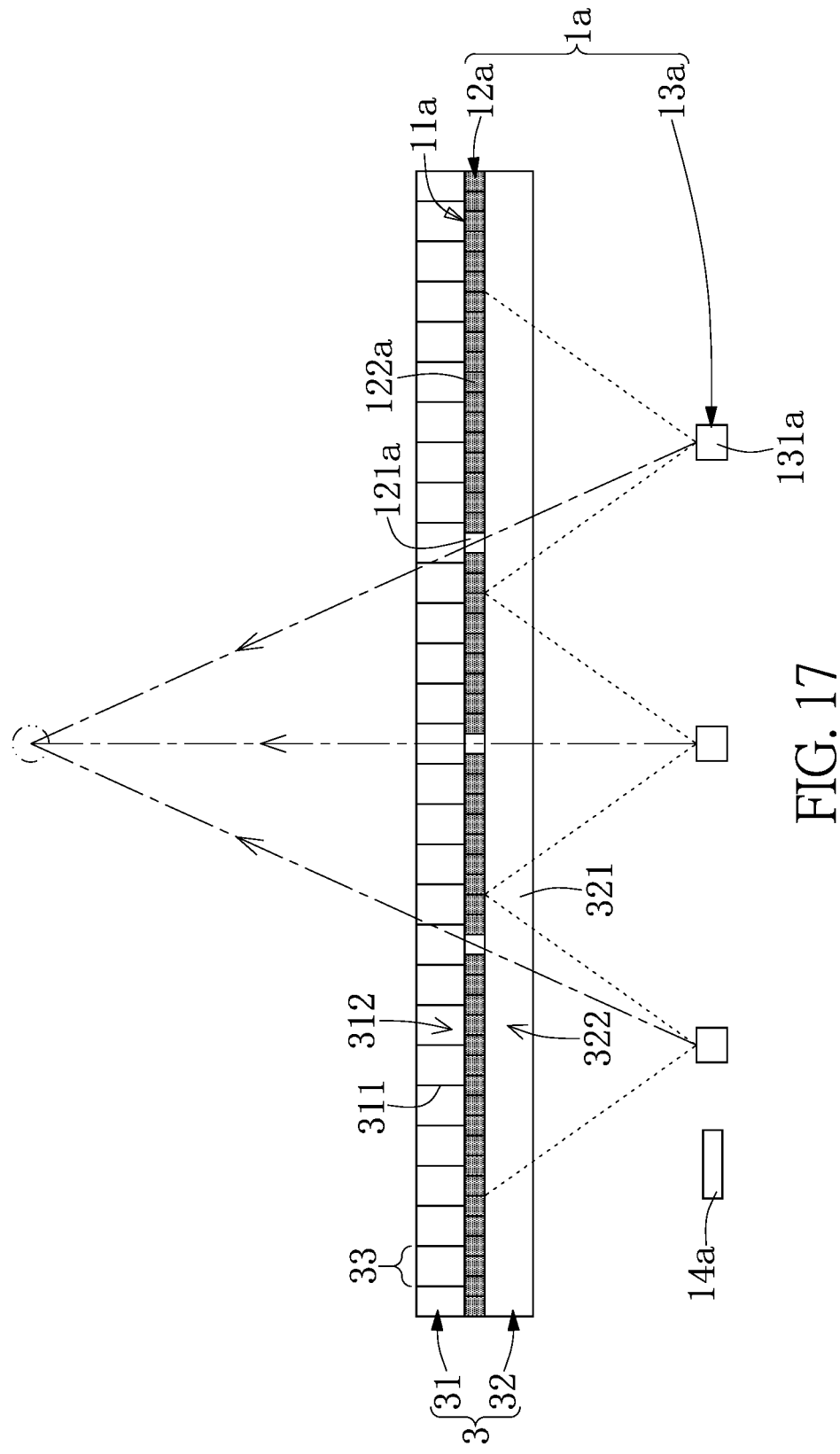
FIG. 17 is a schematic view of the integrated image display device according to a thirteenth embodiment of the present disclosure.

Referring to FIG. 17, the configuration of the image display device of the present embodiment is substantially the same as that of the eleventh embodiment of the present disclosure described above. The only difference is that the first baffle layer 31 and the second baffle layer 32 are respectively disposed on two sides of the LCD panel 12a, that is, the first baffle layer 31 is disposed above the LCD panel 12a, and the second baffle layer 32 is disposed below the LCD panel 12a. The first baffles 311 and the second baffles 321 are configured to shield light to eliminate light of other levels, so that the image display devices have the better stereo image display effect.

Fourteenth Embodiment

Figure 18:
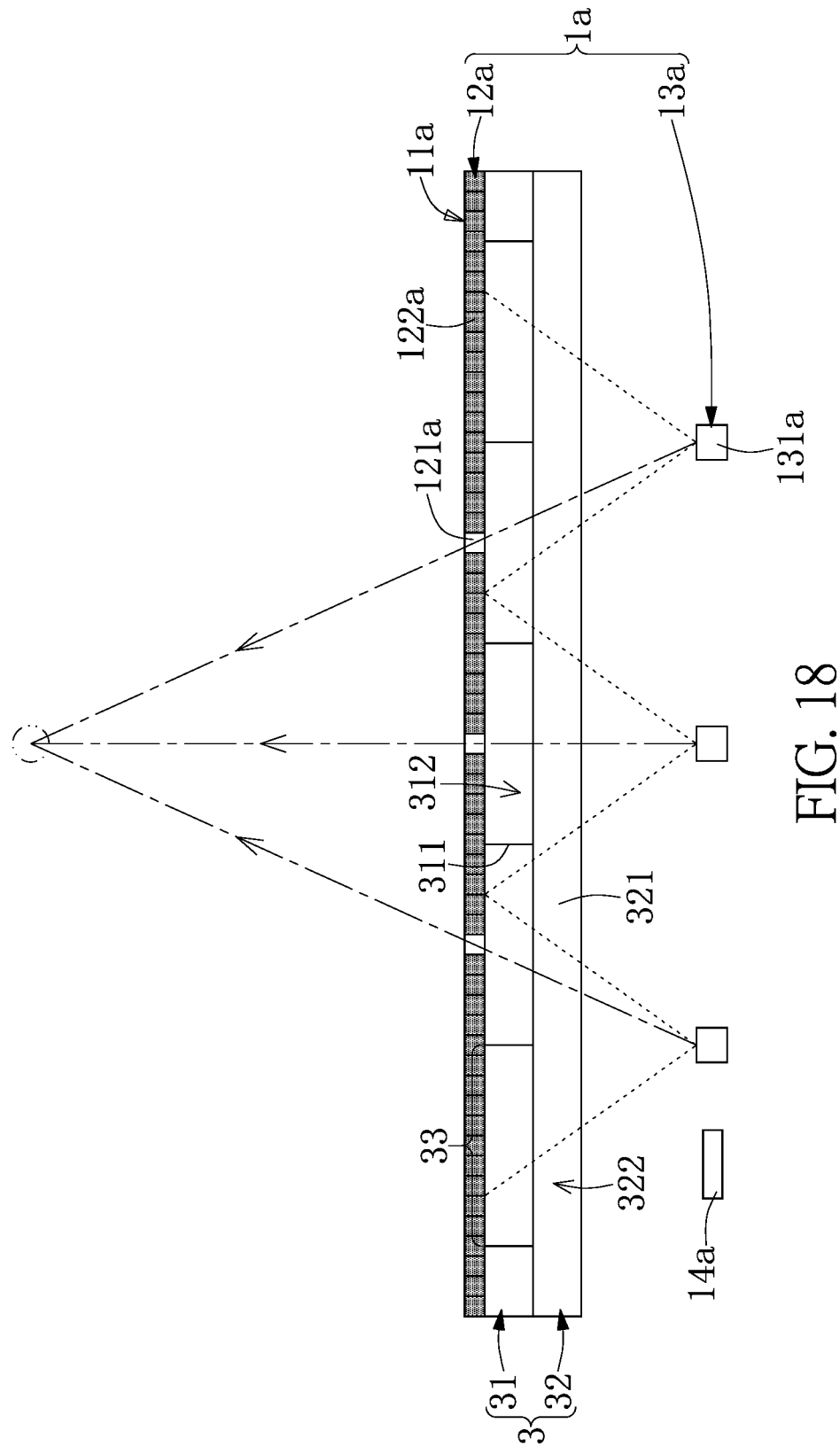
FIG. 18 is a schematic view of the integrated image display device according to a fourteenth embodiment of the present disclosure.

Referring to FIG. 18, the configuration of the image display device of the present embodiment is substantially the same as that of the eleventh embodiment of the present disclosure described above. The only difference is that one of the transmission units 33 corresponds to one of the pixels 121a that needs to be used so that the transmission units 33 respectively correspond to the pixels 121a that need to be used. The first baffles 311 and the second baffles 321 are configured to shield light to eliminate light of other levels, so that the image display devices have the better stereo image display effect.

Fifteenth Embodiment

Figure 19:
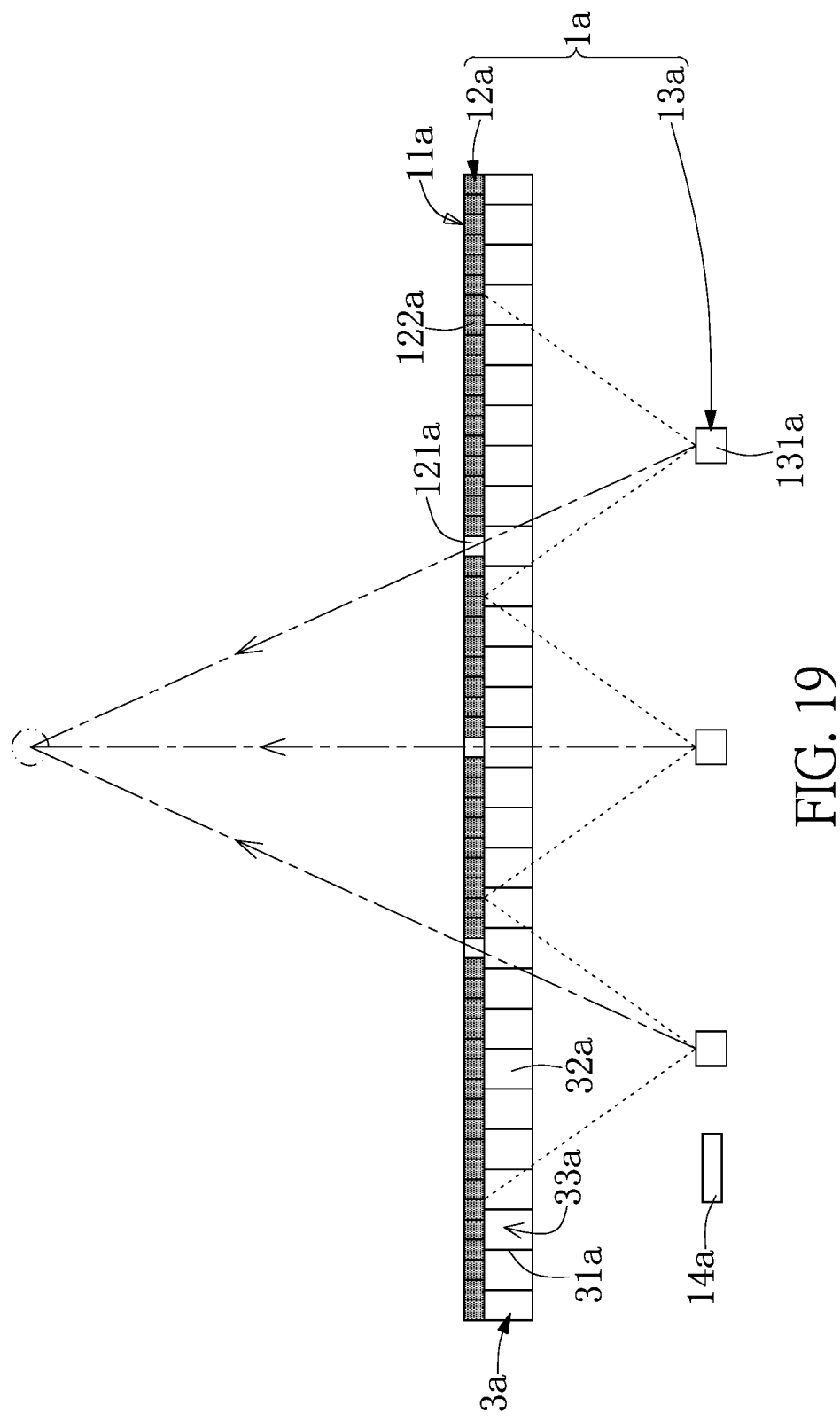
FIG. 19 is a schematic view of the integrated image display device according to a fifteenth embodiment of the present disclosure.

Referring to FIG. 19, the configuration of the image display device of the present embodiment is substantially the same as that of the eleventh embodiment of the present disclosure described above. The only difference is that the baffle assembly 3a is designed as a single layer, and the baffle assembly 3a can be disposed on a side of the LCD panel 12a close to or away from the backlight module 13a. The baffle assembly 3a includes the plurality of first baffles 31a and the plurality of second baffles 32a. The configuration of the baffle assembly 3a is the same as that of the fifth embodiment of the present disclosure, and it will not be reiterated herein. The first baffles 31a and the second baffles 32a are configured to shield light so that the divergence angle of the light emitted by the light source 131a is able to be restricted, and the light cannot be emitted to the LCD panel 12a. Accordingly, the image display devices eliminate light of other levels, so that the image display devices have the better stereo image display effect.

Figure 21:
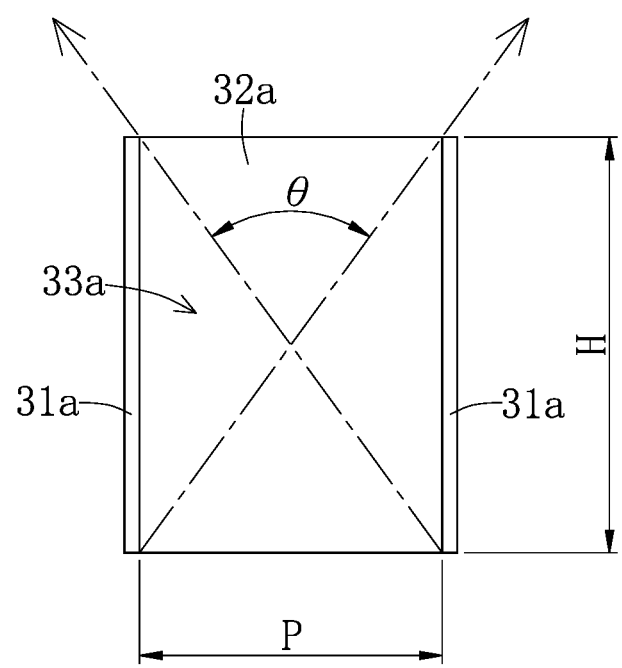
FIG. 21 is a schematic plane view of a baffle and a light divergence angle according to the present disclosure.

In addition, as shown in FIG. 21, an interval between each two adjacent ones of the first baffles 31a or the interval between each two adjacent ones of the second baffles 32a can be defined as P, and the height of the first baffles 31a or the height of the second baffles 32a can be defined as H. The divergence angle of the light passing through the light transmission unit 323 or passing through the first and second light transmission unit 323 can be defined as θ. The divergence angle satisfies the following relationship: $\theta=2\times\tan^{-1}(P/H)$. Accordingly, when the divergence angle is fixed, the lesser the interval P (the denser the baffle), the lesser the height H (the lower the height of the baffle), and the thinner the thickness becomes. The first baffles 31a and the second baffles 32a in the above embodiments of the present disclosure also meet the above-mentioned conditions.

Figure 22:
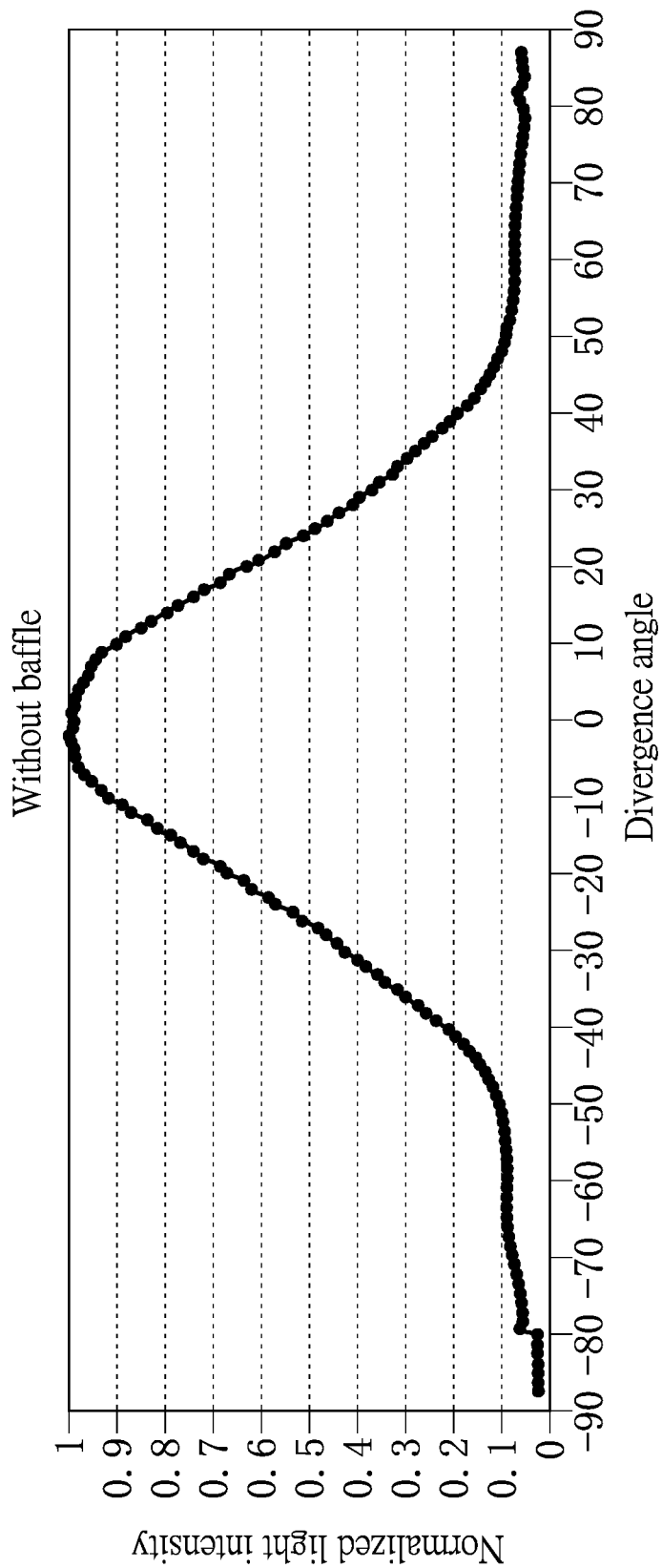
FIG. 22 is a diagram showing a relationship of a normalized light intensity and the divergence angle when no baffle is provided according to the present disclosure.
Figure 23:
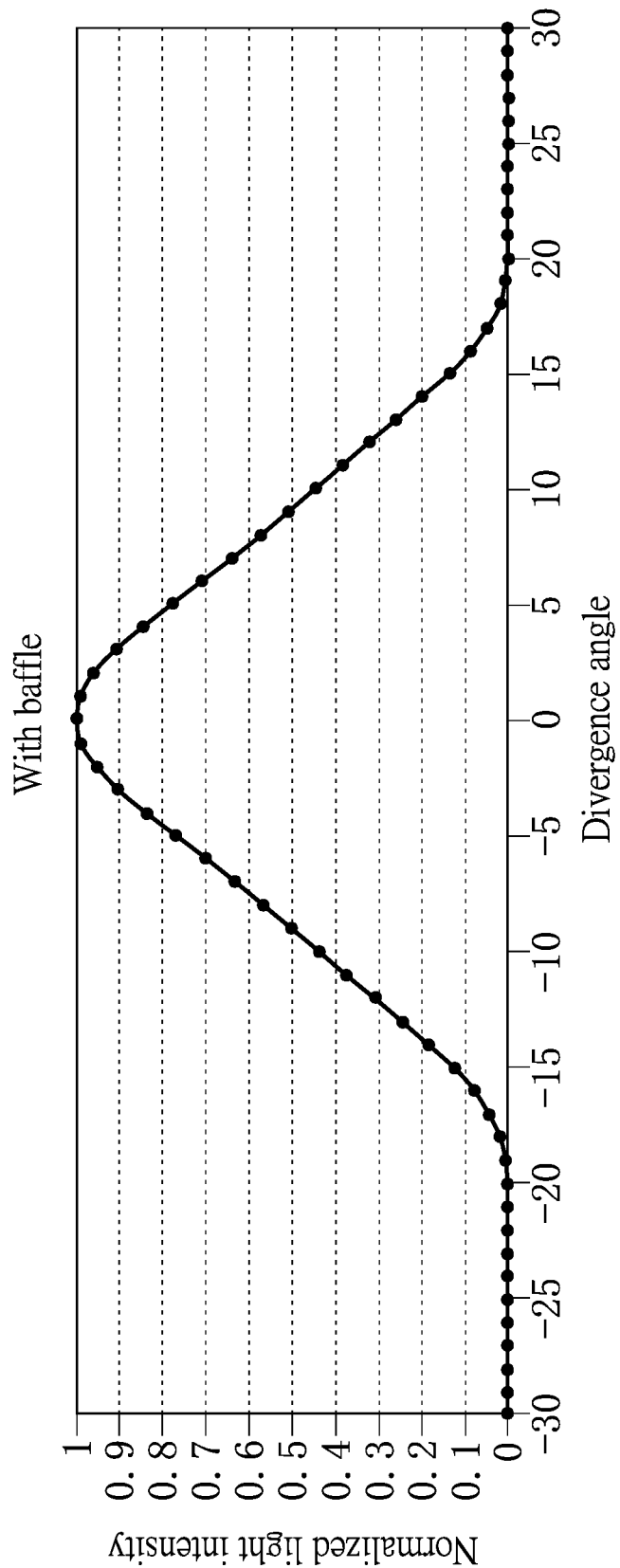
FIG. 23 is a diagram showing a relationship of the normalized light intensity and the divergence angle when a baffle is provided according to the present disclosure.

In addition, as shown in FIG. 22, FIG. 22 is a relationship view of normalized light intensity and light divergence angle when the present disclosure provides no baffle. As shown in FIG. 23, FIG. 23 is a relationship view of normalized light intensity and light divergence angle when the present disclosure provides the baffle. Accordingly, when the baffle (the first baffle and the second baffle) is provided in the present disclosure, the divergence angle of the light emitted by the display unit is able to be restricted.

In conclusion, the present disclosure can provide the floating display effect, so that the viewers can view the stereo images from an oblique angle and a position directly in front of the device. In addition, the present disclosure also provides the baffle assembly that includes the plurality of first baffles and the plurality of second baffles. The first baffles and the second baffles are configured to shield light to solve the problem that the light source of the display has a large light distribution divergence angle which will cause the viewers to view light of other levels when moving. The image display devices can improve the image quality and the divergence angle of the light emitted by the display unit is able to be restricted to eliminate light of other levels, so that the image display devices have the better stereo image display effect. In addition, the first baffle layer and the second baffle layer are individuals and can be manufactured separately. The first baffle layer and the second baffle layer are relatively simple and easy to manufacture, and the thickness of the image display device can be effectively reduced. In addition, according to different product applications, the image display device can limit a single angle of the divergence angle, such as horizontal or vertical divergence angle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An integrated image display device, comprising:
a display unit including a display surface and an image processing unit;
a lens array layer disposed adjacent to the display surface of the display unit, wherein the lens array layer includes a plurality of lenses; and
a baffle assembly including a first baffle layer, and the first baffle layer including a plurality of first baffles, wherein the first baffles are spaced apart from each other, a first transmission portion is formed between each two adjacent ones of the first baffles, the baffle assembly forms a plurality of light transmission units, and the plurality of light transmission units correspond to one of the plurality of lenses; wherein the first baffles are configured to shield light so that a divergence angle of the light emitted by the display unit is able to be restricted, and wherein an un-reconstructed image displayed by the display surface is able to be reconstructed by the lens array layer, and be recombined into an integrated image to form a stereo image; wherein the baffle assembly includes a second baffle layer including a plurality of second baffles spaced apart from each other, the second baffles are configured to shield light, and the first baffles and the second baffles are perpendicular to each other, and wherein the plurality of light transmission units are respectively formed between the first baffles and the second baffles, and arranged in an array manner.

2. The integrated image display device according to claim 1, wherein the second baffle layer is disposed below the first baffle layer.

3. The integrated image display device according to claim 1, wherein the second baffle layer and the first baffle layer are respectively disposed on two sides of the lens array layer that are close to and away from the display unit.

4. The integrated image display device according to claim 1, wherein the first baffle layer and the second baffle layer are all disposed on a side of the lens array layer that is close to or away from the display unit.

5. An integrated image display device, comprising:
a display unit including a display surface and an image processing unit;
a pinhole array layer disposed adjacent to the display surface of the display unit, and including a main body and a plurality of pinholes, wherein the pinholes are disposed on the main body, and the pinholes pass through two opposite sides of the main body; and
a baffle assembly including a first baffle layer, and the first baffle layer including a plurality of first baffles, wherein the first baffles are spaced apart from each other, a first transmission portion is formed between each two adjacent ones of the first baffles, the baffle assembly forms a plurality of light transmission units, and the plurality of light transmission units correspond to one of the plurality of pinholes; wherein the first baffles are configured to shield light so that a divergence angle of the light emitted by the display unit is able to be restricted, and wherein an unstructured image displayed by the display surface is able to be reorganized by the pinhole array layer, and be recombined into an integrated image to form a stereo image; wherein the baffle assembly includes a second baffle layer including a plurality of second baffles spaced apart from each other, wherein the second baffles are configured to shield light, the first baffles and the second baffles are perpendicular to each other, wherein the plurality of light transmission units are disposed between the first baffles and the second baffles, and arranged in an array manner.

6. The integrated image display device according to claim 5, wherein the second baffle layer is disposed below the first baffle layer.

7. The integrated image display device according to claim 5, wherein the second baffle layer and the first baffle layer are respectively disposed on two sides of the pinhole array layer that are close to and away from the display unit.

8. The integrated image display device according to claim 5, wherein the first baffle layer and the second baffle layer are all disposed on a side of the pinhole array layer that is close to or away from the display unit.

9. An integrated image display device, comprising:
a display unit including an LCD panel, a backlight module, and an image processing unit, wherein the LCD panel further includes a display surface, and the LCD panel is able to turn on pixels that need to be used and turn off pixels that need not to be used, and wherein the backlight module includes a plurality of light sources; and a baffle assembly including a first baffle layer, and the first baffle layer including a plurality of first baffles, wherein the first baffles are spaced apart from each other, a first transmission portion is formed between each two adjacent ones of the first baffles, the baffle assembly forms a plurality of light transmission units, and the plurality of light transmission units correspond to one of the pixels that need to be used; wherein the first baffles are configured to shield light so that a divergence angle of the light emitted by the display unit is able to be restricted, and wherein an unstructured image displayed by the display surface is able to be reorganized by the light sources and the LCD panel, and be recombined into an integrated image to form a stereo image; wherein the baffle assembly further includes a second baffle layer including a plurality of second baffles spaced apart from each other, wherein the second baffles are configured to shield light, the first baffles and the second baffles are perpendicular to each other, and wherein the plurality of light transmission units are disposed between the first baffles and the second baffles, and arranged in an array manner.

10. The integrated image display device according to claim 9, wherein the second baffle layer is disposed below the first baffle layer.

11. The integrated image display device according to claim 9, wherein the second baffle layer and the first baffle layer are respectively disposed on two sides of the LCD panel that are close to and away from the backlight module.

12. The integrated image display device according to claim 9, wherein the first baffle layer and the second baffle layer are all disposed on a side of the LCD panel that is close to or away from the backlight module.

* * * * *